US012736190B2

(12) United States Patent
Wu et al.

(10) Patent No.: US 12,736,190 B2
(45) Date of Patent: Sep. 15, 2026

(54) ROTATION-ADJUSTABLE LAMP WITH ROTATING SLEEVE SHEATHED ON LAMP BODY

(71) Applicant: SAVANT TECHNOLOGIES LLC, Cleveland, OH (US)

(72) Inventors: Yongjie Wu, Xiamen (CN); Wenda Wen, Xiamen (CN); Jinshui Ma, Xiamen (CN); Ya Rao, Xiamen (CN)

(73) Assignee: SAVANT TECHNOLOGIES LLC, East Cleveland, OH (US)

(*) Notice: Subject to any disclaimer, the term of this patent is extended or adjusted under 35 U.S.C. 154(b) by 0 days.

(21) Appl. No.: 19/245,160

(22) Filed: Jun. 20, 2025

(65) Prior Publication Data

US 2025/0314373 A1 Oct. 9, 2025

(30) Foreign Application Priority Data

Apr. 27, 2025 (CN) ......................... 202520812605.4

(51) Int. Cl.
*F21K 9/235* (2016.01)

(52) U.S. Cl.
CPC .................................... *F21K 9/235* (2016.08)

(58) Field of Classification Search
CPC ........ F21Y 2115/10; F21K 9/235; F21K 9/65; F21K 9/278; F21K 9/272; F21K 9/275; F21V 21/30
See application file for complete search history.

(56) References Cited

U.S. PATENT DOCUMENTS 7,241,025 B2 * 7/2007 Kim ........................ F21L 4/005 362/208
9,992,848 B2 * 6/2018 Chang .................. H05B 47/105
2021/0120644 A1 * 4/2021 Halliwell ................ F21V 23/04
2023/0103093 A1 * 3/2023 Huang .................... F21K 9/238 315/112

* cited by examiner

*Primary Examiner* — Robert J May
(74) *Attorney, Agent, or Firm* — Wood IP LLC

(57) ABSTRACT

A rotation-adjustable lamp includes a main lamp body and a rotating sleeve rotatably sheathed outside the main lamp body. The main lamp body includes a light-emitting assembly and a control end for controlling the light-emitting assembly, and a connecting portion connected to the control end is provided within the rotating sleeve. Therefore, when the rotating sleeve is rotated, the control end can be driven to move at the same time, and then the adjustment of the lamp function is achieved by the movement of the control end.

18 Claims, 8 Drawing Sheets

ROTATION-ADJUSTABLE LAMP WITH ROTATING SLEEVE SHEATHED ON LAMP BODY

CROSS-REFERENCE TO RELATED APPLICATIONS

This application claims priority to Chinese Patent Application No. 202520812605.4, filed Apr. 27, 2025, the contents of which are incorporated herein by reference.

TECHNICAL FIELD

The present application relates to the technical field of lighting, and in particular to a rotation-adjustable lamp.

BACKGROUND

At present, most of the existing intelligent lamps are controlled by wireless remote control to adjust the color temperature, brightness, and so on. Since not only are the lamps being developed, but also the corresponding remote control needs to be designed, the development cost is high. At the same time, it is usually difficult to set a switch directly on the lamp by using the control mode of a mechanical switch, so that the lamp can not be controlled flexibly.

SUMMARY

The technical problem to be solved by the present application is to provide a rotation-adjustable lamp, the lighting effect of which can be adjusted in the form of a mechanical switch.

In order to solve the above technical problems, the technical solutions adopted by the present application are below.

A rotation-adjustable lamp includes a main lamp body and a rotating sleeve rotatably sheathed outside the main lamp body, wherein the main lamp body includes a light-emitting assembly and a control end for controlling the light-emitting assembly, and a connecting portion connected to the control end is provided within the rotating sleeve. This lamp can drive the control end to act by rotating the rotating sleeve, so as to control the light-emitting assembly, thereby achieving the adjustment of this lamp.

Further, the main lamp body is provided with a hollowed-out portion, and one of the connecting portion and the control end passes through the hollowed-out portion and is connected to the other, thereby facilitating the connection between the connecting portion and the control end.

Further, a position of the control end corresponds to a position of the hollowed-out portion. Therefore, the alignment and connection between the connecting portion and the control end can be further facilitated, which is conducive to simplifying the structure.

Further, the main lamp body includes a driving assembly, and the driving assembly has the control end. Therefore, the control and adjustment of this lamp are facilitated.

Further, the main lamp body further includes a fixed shell assembly, the driving assembly is provided within the fixed shell assembly, and the hollowed-out portion is provided on the fixed shell assembly. Therefore, the driving assembly can be protected.

Further, the rotating sleeve is rotatably sheathed outside the fixed shell assembly, which facilitates processing and assembly.

Further, the light-emitting assembly is provided on one side of the driving assembly away from the fixed shell assembly, such that the fixed shell assembly can be avoided from blocking light.

Further, the fixed shell assembly includes a lamp base component and a plastic shell component, the lamp base component is sheathed outside the plastic shell component, and the driving assembly is provided within the plastic shell component. A favorable insulation and protection effect on the driving assembly can be achieved.

Further, the hollowed-out portion includes a first sub-hollowed portion provided on the lamp base component and a second sub-hollowed portion provided on the plastic shell component, and a position of the second sub-hollowed portion is aligned with a position of the first sub-hollowed portion, which facilitates processing, manufacturing and assembly.

Further, the plastic shell component is provided with a snap fastener, and the snap fastener is clamped with an edge of the first sub-hollowed portion, which facilitates processing and assembly.

Optionally, the lamp base component is provided with a snap fastener, and the snap fastener is clamped with an edge of the second sub-hollowed portion, which also facilitates processing and assembly.

Further, a hook is provided within the rotating sleeve; and an engagement platform cooperating with the hook is provided on the fixed shell assembly, which facilitates processing and assembly.

Further, the driving assembly includes a driver board and a dip switch; the driver board is provided within the fixed shell assembly; and the control end is a toggle lever of the dip switch. The structure is simple and reliable and facilitates processing, manufacturing and control.

Further, the dip switch is provided on one side of the driver board near a bottom of the fixed shell assembly, which facilitates assembly and connection and can avoid the interference of the dip switch on the light-emitting assembly and the influence of heat generated by the light-emitting assembly during working, thereby being conducive to prolonging the service life.

Further, a first mating portion is provided on the driver board; a second mating portion is correspondingly provided on an inner side of the fixed shell assembly; and the first mating portion is clamped with the second mating portion, which is convenient for the positioning and fixation of the driver board and facilitates processing and assembly.

Further, the connecting portion of the rotating sleeve includes two oppositely provided limiting rods; and the control end of the dip switch is provided between two of the limiting rods. The rotating sleeve can drive the control end to act through the limiting rods, achieving simple structure and convenience in processing and assembly.

Further, a bulb shell is also included; the bulb shell is sheathed on an outer side of the light-emitting assembly and is connected to the fixed shell assembly, such that the light-emitting assembly can be protected.

Further, an outer side of the rotating sleeve is provided with a protrusion, which provides convenience for manual operations of a user.

Further, a position of the protrusion corresponds to the position of the connecting portion, such that the position of the connecting portion is determined conveniently during assembly, providing convenience for assembly.

Further, the light-emitting assembly includes a filament light source; and the filament light source is a same-level different-color-temperature filament, or at least two filaments of different color temperatures. Therefore, color temperatures of light can be switched to achieve more abundant functions.

The beneficial effects of the present application are as follows: by providing a hollowed-out portion on the fixed shell assembly and providing the driving assembly in the fixed shell assembly, the control end of the driving assembly corresponds to the position of the hollowed-out portion, and with rotatably sleeving the rotating sleeve on the outside of the fixed shell assembly and connecting the connecting portion of the rotating sleeve with the control end of the driving assembly, when the rotating sleeve is rotated, the control end of the driving assembly in the fixed shell assembly can be driven to move at the same time, so that the adjustment of the lamp function can be achieved by the movement of the control end.

DETAILED DESCRIPTION OF THE EMBODIMENTS

Figure 1:
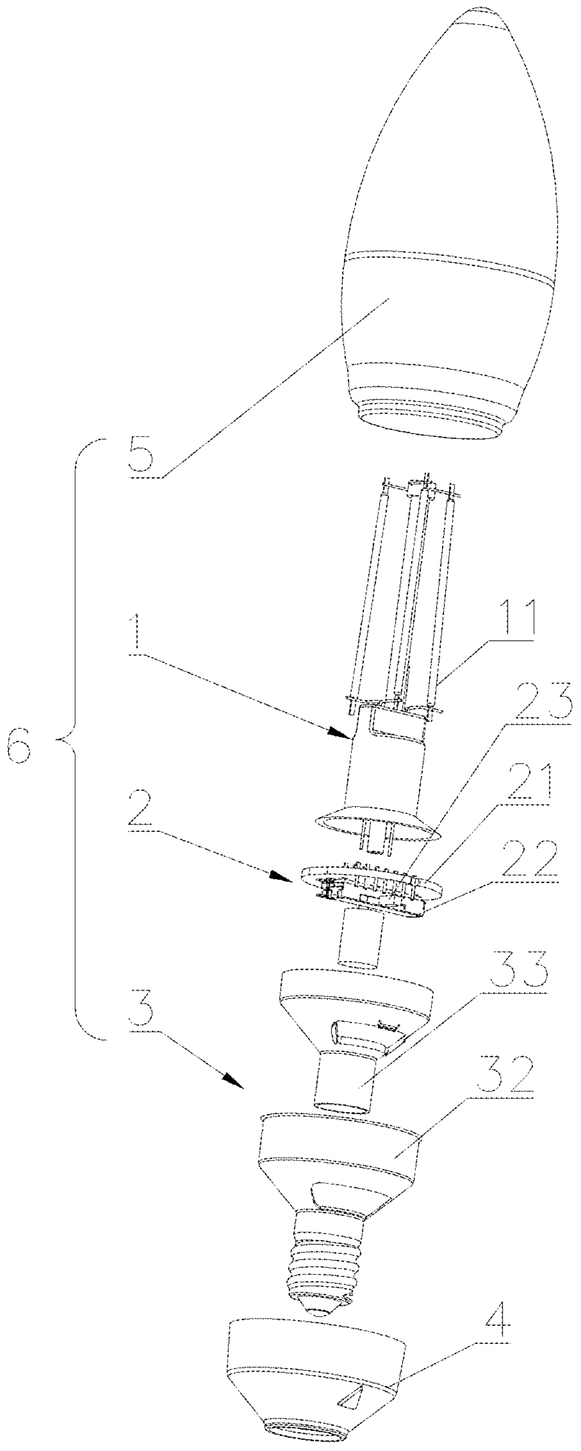
FIG. 1 is an exploded view of a structure of a rotation-adjustable lamp in an embodiment of the present application.

In order to explain the technical contents, the objects, and the effects of the present application in detail, the following description will be given in conjunction with the implementation modes and in conjunction with the accompanying drawings.

The present application provides a rotation-adjustable lamp, including a light-emitting assembly 1, a driving assembly 2, a fixed shell assembly 3 and a rotating sleeve 4; the driving assembly 2 is provided in the fixed shell assembly 3, and the light-emitting assembly 1 is provided on a side of the driving assembly 2 remote from the fixed shell assembly 3; the fixed shell assembly 3 is provided with a hollowed-out portion 31, and a control end 23 of the driving assembly 2 corresponds to the position of the hollowed-out portion 31; the rotating sleeve 4 is rotatably sheathed outside the fixed shell assembly 3; and a connecting portion 41 is provided on the inner side of the rotating sleeve 4, and the connecting portion 41 is connected to the control end 23 of the driving assembly 2 through the hollowed-out portion 31.

It can be seen from the above-mentioned description that the beneficial effects of the present application are as follows: by providing a hollowed-out portion 31 on the fixed shell assembly 3 and providing the driving assembly 2 in the fixed shell assembly 3, the control end 23 of the driving assembly 2 corresponds to the position of the hollowed-out portion 31, and with rotatably sleeving the rotating sleeve 4 on the outside of the fixed shell assembly 3 and connecting the connecting portion 41 of the rotating sleeve 4 with the control end 23 of the driving assembly 2, when the rotating sleeve 4 is rotated, the control end 23 of the driving assembly 2 in the fixed shell assembly 3 can be driven to move at the same time, so that the adjustment of the lamp function can be achieved by the movement of the control end 23.

Further, the fixed shell assembly 3 includes a lamp base component 32 and a plastic shell component 33; a first sub-hollowed portion 321 is provided on one side of the lamp base component 32, and a second sub-hollowed portion 332 is provided on one side of the plastic shell component 33; the plastic shell component 33 is sheathed in the lamp base component 32, and the position of the second sub-hollowed portion 331 coincides with the position of the first sub-hollowed portion 321; and the driving assembly 2 is provided within the plastic shell component 33.

It can be seen from the above-mentioned description that the insulating effect of the lamp can be improved by sleeving the plastic shell component 33 and the lamp base component 32 to form a fixed shell assembly 3, and arranging the driving assembly 2 in the plastic shell.

Further, the top of the second sub-hollowed portion 331 is provided with a snap fastener 332; and the snap fastener 332 is clamped with the first sub-hollowed portion 321.

It can be seen from the above-mentioned description that the stability of the connection between the plastic shell component 33 and the lamp base component 32 is improved by providing a snap fastener 332 on the top of the second sub-hollowed portion 331 of the plastic shell component 33 so as to form a snap fit between the snap fastener 332 and the first sub-hollowed portion 321 of the lamp base component 32.

Further, a hook 42 is provided inside the rotating sleeve 4; and an engagement platform 333 cooperating with the hook 42 is provided on the inner side of the hollowed-out portion 31 of the fixed shell assembly 3.

It can be seen from the above-mentioned description that the rotary engagement between the rotating sleeve 4 and the fixed shell assembly 3 is achieved by providing a hook 42 inside the rotating sleeve 4, and providing an engagement platform 333 inside the hollowed-out portion 31 of the fixed shell assembly 3; and moving the hook 42 on the engagement platform 333 while connecting the rotating sleeve 4 and the fixed shell assembly 3 by means of the engagement between the hook 42 and the engagement platform 333.

Further, the driving assembly 2 includes a driver board 21 and a dip switch 22; the driver board 21 is provided within the fixed shell assembly 3; the dip switch 22 is provided on one side of the driver board 21 near the bottom of the fixed shell assembly 3; the position of the control end 23 of the dip switch 22 corresponds to the position of the hollowed-out portion 31 of the fixed shell assembly 3; and the connecting portion 41 of the rotating sleeve 4 passes through the hollowed-out portion 31 and is connected to the control end 23 of the dip switch 22.

It can be seen from the above-mentioned description that by arranging the dip switch 22 on one side of the driver board 21 close to the bottom of the fixed shell assembly 3, the dip switch 22 is closer to one side of the lamp base so that it is more advantageous for the dial-up end of the dip switch 22 to form a cooperation with the hollowed-out portion 31 and the connecting portion 41.

Further, a first mating portion 211 is provided on the driver board 21; a corresponding second mating portion 334 is provided on the inner side of the fixed shell assembly 3; and the first mating portion 211 is snapped onto the second mating portion 334.

It can be seen from the above-mentioned description that by providing a first mating portion 211 on the driver board 21, and providing a second mating portion 334 on the inner side of the fixed shell assembly 3, and by means of the snap-fit mating between the first mating portion 211 and the second mating portion 334, not only the effect of fixing the driver board 21 on the fixed shell assembly 3 is achieved, but also the effect of positioning the dip switch 22 and the hollowed-out portion 31 is achieved.

Further, the connecting portion 41 of the rotating sleeve 4 comprises two limiting rods 411 provided opposite to each other; and a control end 23 of the dip switch 22 is provided between the two limiting rods 411.

It can be seen from the above-mentioned description that by using two limiting rods 411 as connecting portions 41, and arranging the control end 23 of the dip switch 22 between the two limiting rods 411, when the rotating sleeve 4 is rotated, the two limiting rods 411 can drive the control end 23 of the dip switch 22 to move at the same time, so as to achieve the adjustment of different functions of the lamp.

Further, an outer side of the rotating sleeve 4 is provided with a protrusion 43; and the position of the protrusion 43 corresponds to the position of the connecting portion 41.

It can be seen from the above-mentioned description that it is convenient for a user to rotate the rotating sleeve 4 via the protrusion 43 by providing the protrusion 43 on the outer side of the rotating sleeve 4, and making the position of the protrusion 43 correspond to the position of the connecting portion 41.

Further, the light-emitting assembly 1 includes a filament light source 11; and the filament light source 11 is a same-level different-color-temperature filament, or at least two filaments of different color temperatures.

It can be seen from the above-mentioned description that the light-emitting assembly 1 uses a same-level different-color-temperature filament, or at least two filaments of different color temperatures, so as to cooperate with the driving assembly 2 and the rotating sleeve 4 to achieve the adjustment of different color temperatures of the lamp.

Further, a bulb shell 5 is also included; and the bulb shell 5 is sheathed on the outer side of the light-emitting assembly 1 and is connected to the fixed shell assembly 3.

It can be seen from the above-mentioned description that by providing a bulb shell 5, it is possible to select different bulb shells 5 according to different application scenarios so as to meet the lighting requirements or decorative requirements of a lamp in different application scenarios.

The lamp body 6 in the present application includes the light-emitting assembly 1, the driving assembly 2, the fixed shell assembly 3 and the bulb shell 5.

The rotation-adjustable lamp provided by the present application can be applied to different types of lamp products, such as filament lamps, to achieve the conditions for the color temperature and brightness of the filament lamp, and the following description is given by way of specific implementation modes:

Referring to FIGS. 1 to 9, a rotation-adjustable lamp includes a light-emitting assembly 1, a driving assembly 2, a fixed shell assembly 3 and a rotating sleeve 4. The driving assembly 2 is provided in the fixed shell assembly 3, and the light-emitting assembly 1 is provided on one side of the driving assembly 2 away from the fixed shell assembly 3; the fixed shell assembly 3 is provided with a hollowed-out portion 31, and the control end 23 of the driving assembly 2 corresponds to the position of the hollowed-out portion 31; the rotating sleeve 4 is rotatably sheathed outside the fixed shell assembly 3; a connecting portion 41 is provided on the inner side of the rotating sleeve 4, and the connecting portion 41 passes through the hollowed-out portion 31 and is connected to a control end 23 of the driving assembly 2; and the rotating sleeve 4 not only functions as a rotary toggle, but also as an insulation. And further, a bulb shell 5 is included, wherein the bulb shell 5 is sheathed on the outer side of the light-emitting assembly 1 and is connected to the fixed shell assembly 3. The light-emitting assembly 1 comprises a filament light source 11; the filament light source 11 is a same-level different-color-temperature filament, or at least two filaments of different color temperatures.

Figure 4:
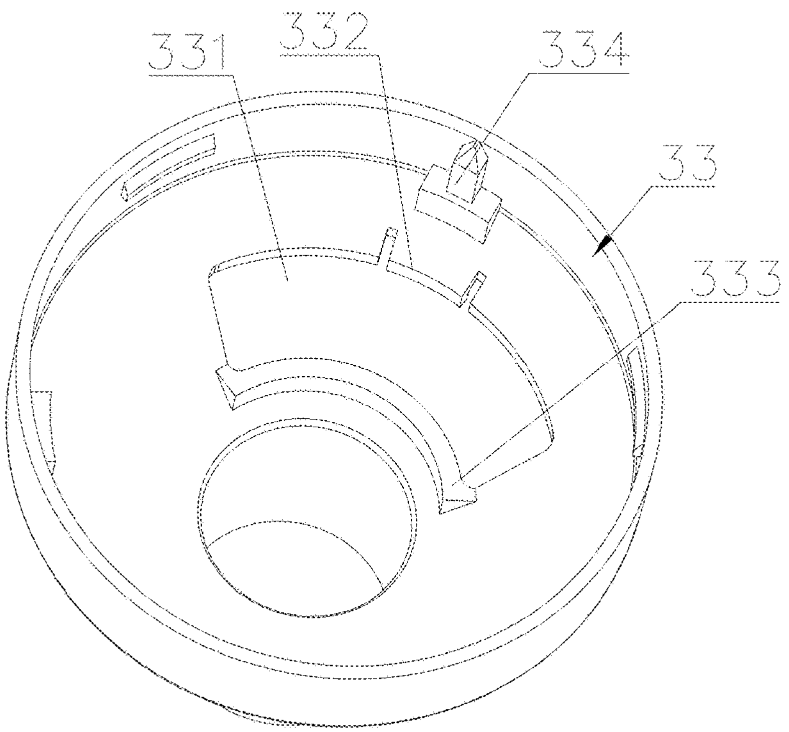
FIG. 4 is a schematic view showing an internal structure of a plastic shell component of a rotation-adjustable lamp according to an embodiment of the present application.
Figure 5:
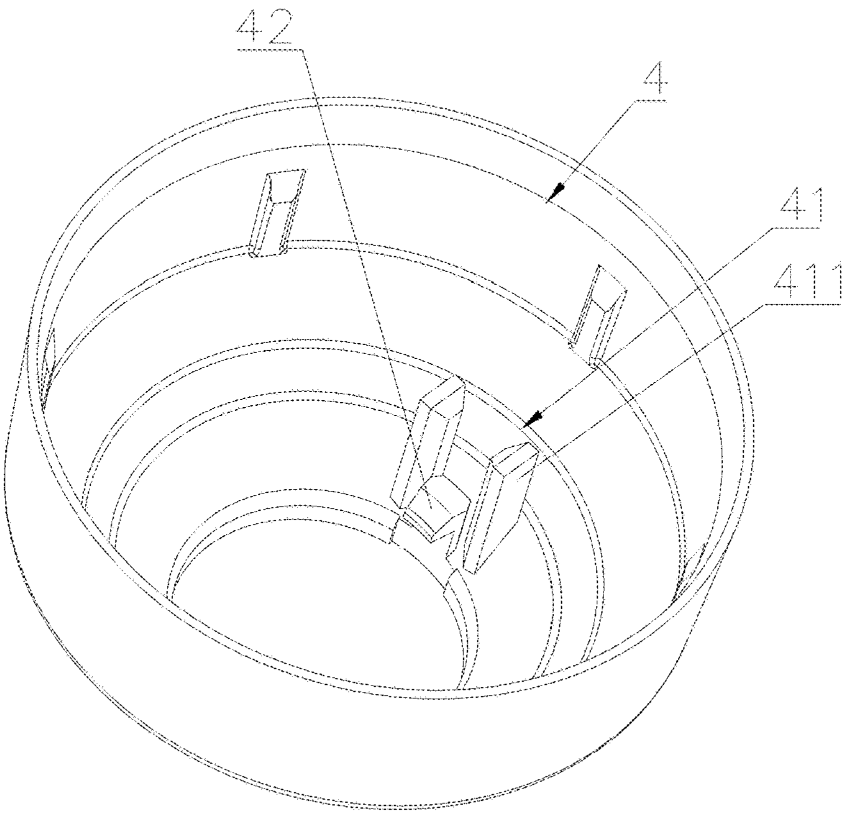
FIG. 5 is a schematic view of an internal structure of a rotating sleeve of a rotation-adjustable lamp in an embodiment of the present application.
Figure 6:
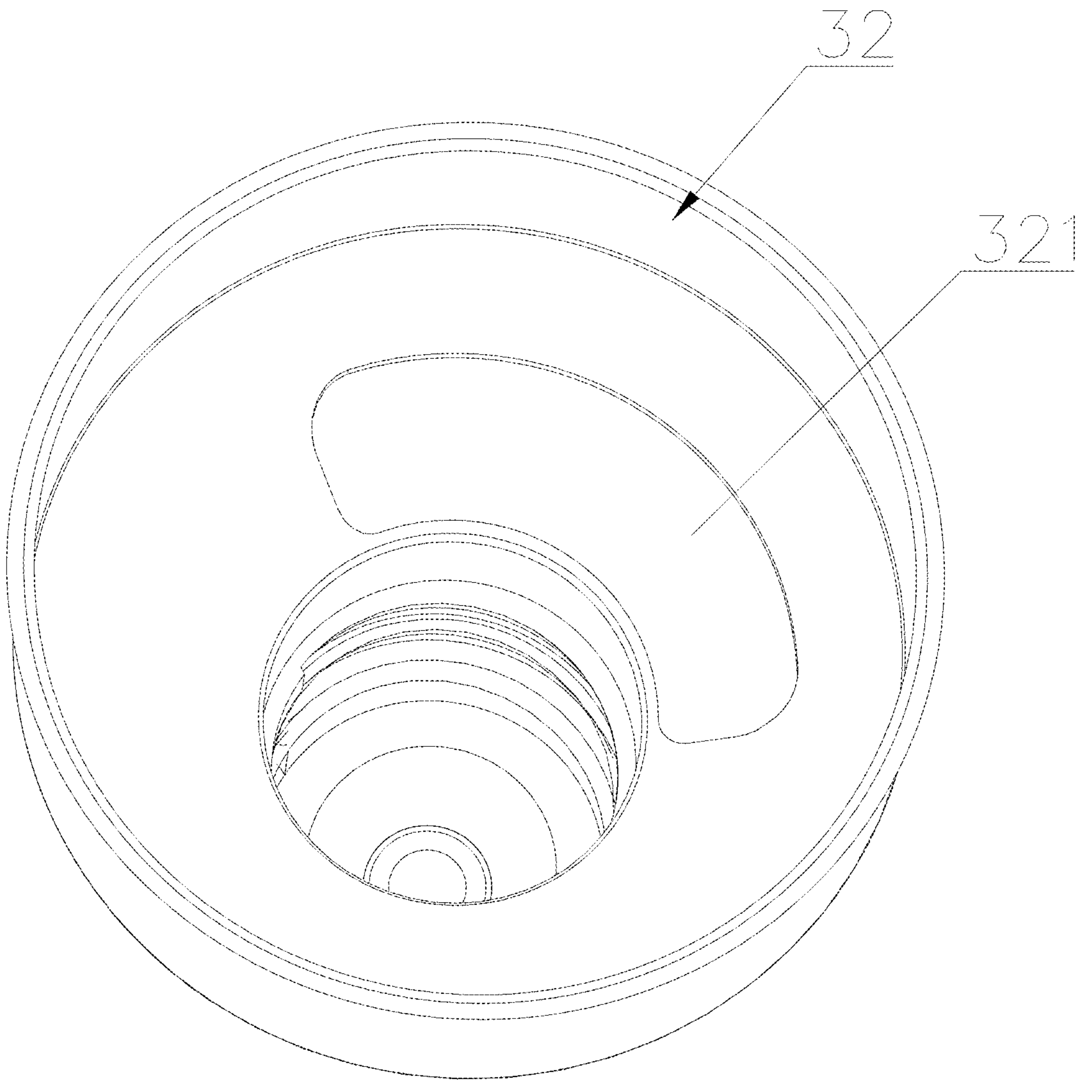
FIG. 6 is a schematic view showing an internal structure of a lamp base component of a rotation-adjustable lamp according to an embodiment of the present application.
Figure 10:
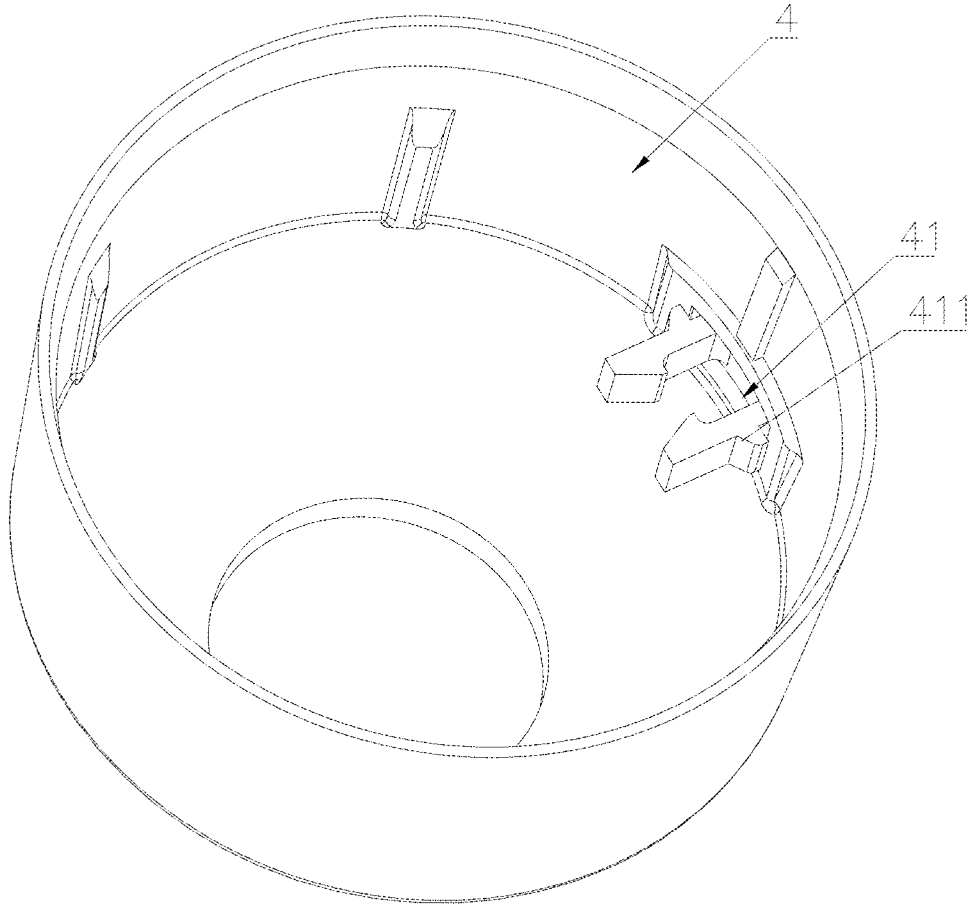
FIG. 10 is a schematic view showing an internal structure of another rotating sleeve of a rotation-adjustable lamp according to an embodiment of the present application.

The fixed shell assembly 3 includes a lamp base component 32 and a plastic shell component 33; with reference to FIGS. 4 and 6, a first sub-hollowed portion 321 is provided on one side of the lamp base component 32, and a second sub-hollowed portion 331 is provided on one side of the plastic shell component 33; the plastic shell component 33 is sheathed in the lamp base component 32, and the position of the second sub-hollowed portion 331 coincides with the position of the first sub-hollowed portion 321; namely, the first sub-hollowed portion 321 and the second sub-hollowed portion 331 together form the hollowed-out portion 31; and the driving assembly 2 is provided within the plastic shell component 33. In some alternative implementation modes, the lamp base component 32 and the plastic shell component 33 may be integrally formed. The driving assembly 2 includes a driver board 21 and a dip switch 22; the driver board 21 is provided in the fixed shell assembly 3; the dip switch 22 is provided on one side of the driver board 21 close to the bottom of the fixed shell assembly 3; the position of the control end 23 of the dip switch 22 corresponds to the position of the hollowed-out portion 31 of the fixed shell assembly 3; the connecting portion 41 of the rotating sleeve 4 passes through the hollowed-out portion 31 and is connected to the control end 23 of the dip switch 22; and the control end 23 is a toggle lever of the dip switch 22. The dip switch 22 is connected to the driver board 21 in a horizontal manner, or is connected to the driver board 21 in a vertically provided manner. For example, the scenario that when the dip switch 22 is set in a horizontal manner, that is, the toggle lever is horizontal; as shown in FIG. 5, the connecting portion 41 of the rotating sleeve 4 comprises two limiting rods 411 provided opposite to each other, and the two limiting rods 411 are provided vertically, and the toggle lever of the dip switch 22 is placed between the two limiting rods 411. In another alternative implementation mode, please refer to FIG. 10, the connecting portion 41 of the rotating sleeve 4 comprises two limiting rods 411 provided opposite to each other, and the two limiting rods 411 are provided horizontally, and the toggle lever of the dip switch 22 is placed between the two limiting rods 411; wherein the connecting portion 41 is detachably connected to the rotating sleeve 4, and, by providing a protrusion on a side edge of the limiting rod 411, is snap-connected to the inner wall of the rotating sleeve 4. When the dip switch 22 is provided in a vertical manner, namely, the toggle lever is vertical, the connecting portion 41 of the rotating sleeve 4 is also changed accordingly, for example, a scenario that the limiting rod 411 is provided horizontally, so that the connecting portion 41 can form a fit with the toggle lever. In some alternative implementation modes, the connecting portion 41 is connected to the toggle lever of the dip switch 22 in a half-pack or full-pack configuration. In some alternative implementation modes, the dip switch 22 can select a switch with a corresponding number of gear positions according to switching requirements. For example, the scenario that the dip switch 22 has six gear positions, with each gear position corresponding to a different color temperature, for achieving color temperature switching; or each gear position corresponds to a different brightness for achieving switching of different brightnesses.

A snap fastener 332 is provided at the top of the second sub-hollowed portion 331; the snap fastener 332 is in clamping connection with the first sub-hollowed portion 321; a hook 42 is provided inside the rotating sleeve 4; the inner side of the hollowed-out portion 31 of the fixed shell assembly 3 is provided with an engagement platform 333 which mates with the hook 42; and the engagement platform 333 is provided on one side of the second sub-hollowed portion 331 away from the snap fastener 332. In some alternative implementation modes, the rotatable connection between the rotating sleeve 4 and the plastic shell component 33 is achieved by grooving the left and right sides in the plastic shell component 33, respectively, and providing the rotating sleeve 4 with two hooks adapted to the grooves.

Figure 2:
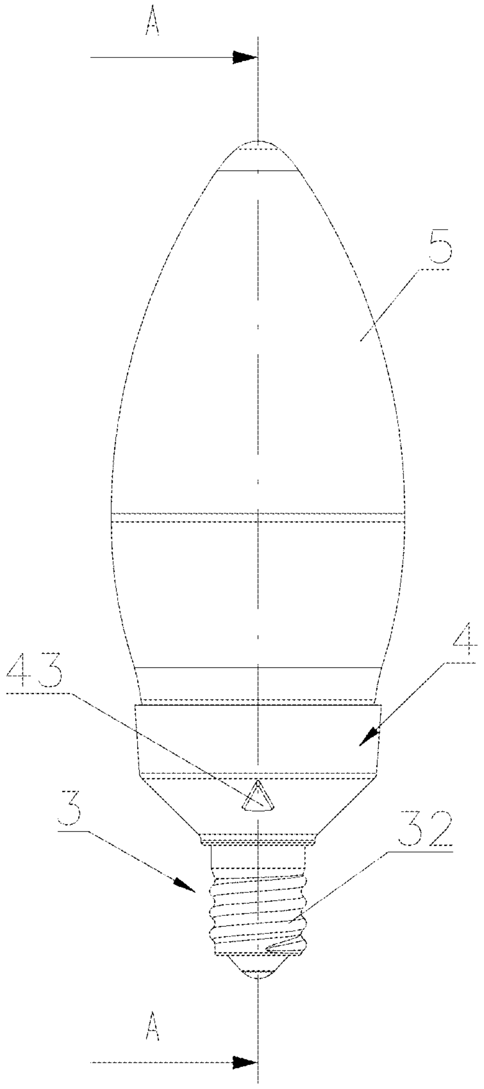
FIG. 2 is a schematic structural view of a rotation-adjustable lamp according to an embodiment of the present application.
Figure 3:
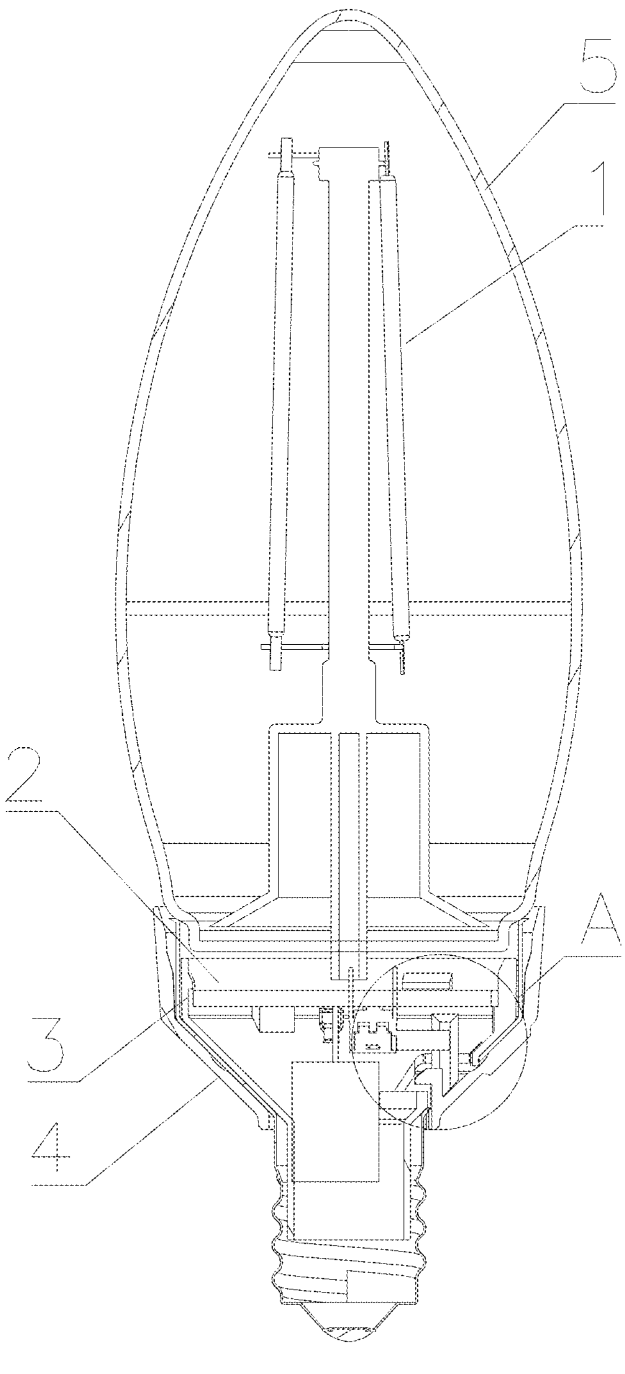
FIG. 3 is a schematic cross-sectional view of face A-A of a rotation-adjustable lamp according to an embodiment of the present application.
Figure 7:
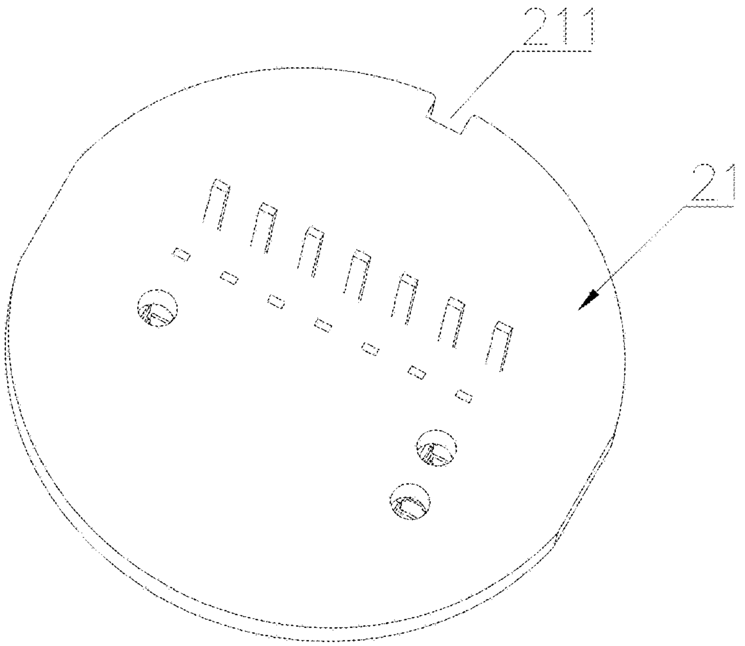
FIG. 7 is a schematic view showing a structure of a driver board of a rotation-adjustable lamp in an embodiment of the present application.
Figure 8:
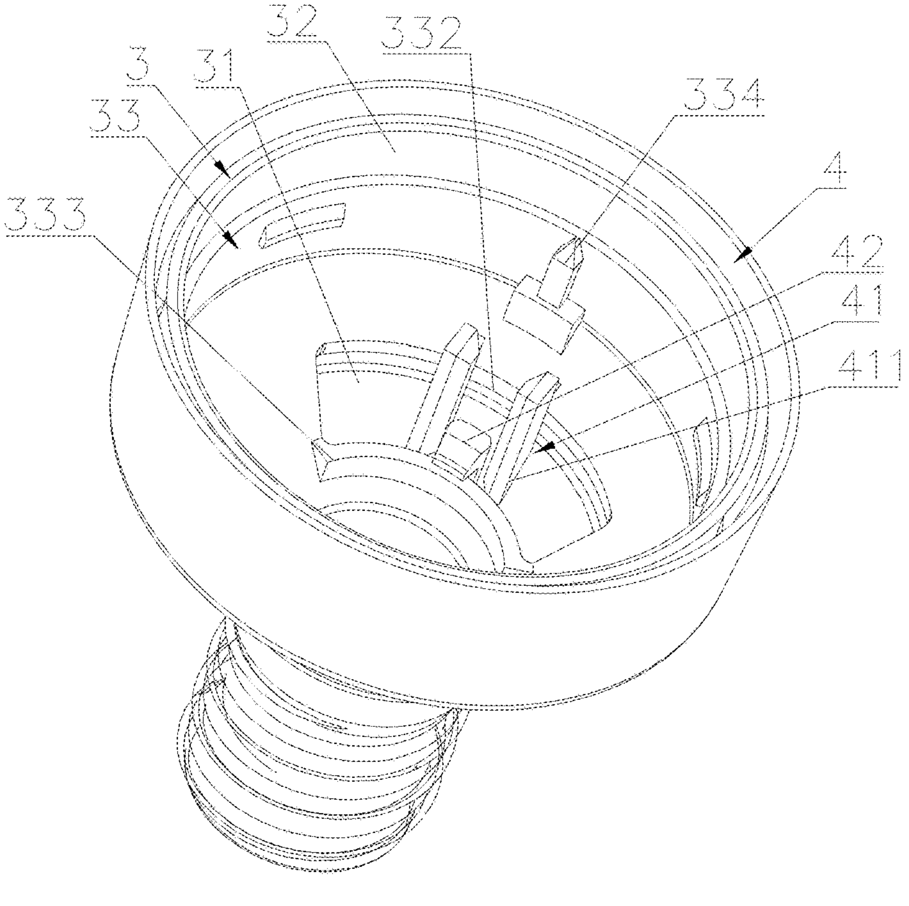
FIG. 8 is a schematic view showing a connection between a fixed shell assembly and a rotating sleeve of a rotation-adjustable lamp according to an embodiment of the present application.
Figure 9:
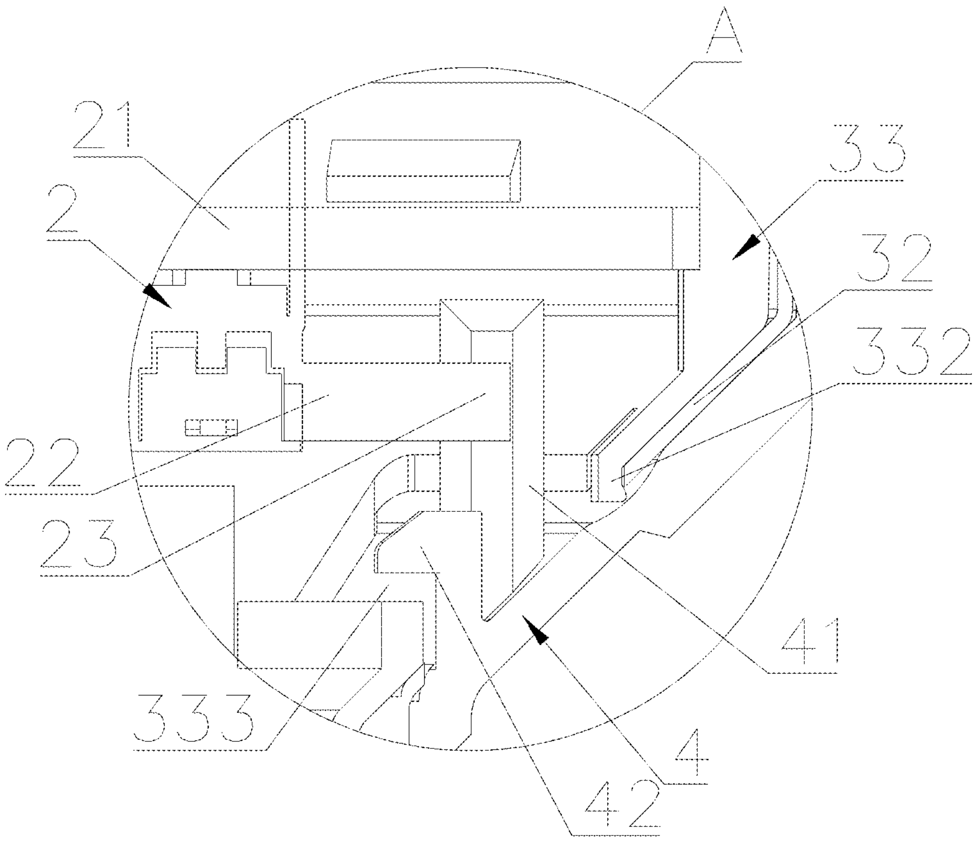
FIG. 9 is an enlarged view of the structure of portion A in FIG. 3.

Referring to FIGS. 4 and 7, the driver board 21 is provided with a first mating portion 211. A corresponding second mating portion 334 is provided on the inner side of the fixed shell assembly 3; the first mating portion 211 is clamped with the second mating portion 334; and wherein the second mating portion 334 is provided on an inner side of the plastic shell component 33. In some alternative implementation modes, the first mating portion 211 is a groove and the second mating portion 334 is a stop block, with the groove and the stop block cooperating to positionally connect the driver board 21 to the plastic shell component 33. In some alternative implementation modes, the first mating portion 211 is a stop block and the second mating portion 334 is a groove; and the connection relationship between the first mating portion 211 and the second mating portion 334 is set according to a specific scenario. As shown in FIG. 2, a protrusion 43 is provided on the outer side of the rotating sleeve 4; and the position of the protrusion 43 corresponds to the position of the connecting portion 41.

Taking the switching of the color temperature as an example, the above-mentioned rotation-adjustable lamp is used in the following manner.

When it is necessary to switch the color temperature, rotating the rotating sleeve 4 is conducted, so that the connecting portion 41 of the rotating sleeve 4 drives the toggle lever of the dip switch 22 to move; and at this time, the driving circuit on the driver board 21 switches the color temperature after receiving a signal of the movement of the toggle lever. Wherein the drive circuit achieves the switching of different color temperatures by setting the resistance values of different gear positions.

The above-mentioned description is merely an embodiment of the present application, and does not limit the scope of the present application. Any equivalent change made by using the contents of the description and the drawings of the present application or directly or indirectly used in relevant technical fields is likewise included in the scope of protection of the present application.

What is claimed is:

1. A rotation-adjustable lamp, comprising a main lamp body and a rotating sleeve rotatably sheathed outside the main lamp body, wherein the main lamp body comprises a light-emitting assembly and a control end for controlling the light-emitting assembly, and a connecting portion connected to the control end is provided within the rotating sleeve;

the main lamp body further comprises a fixed shell assembly, the rotating sleeve is rotatably sheathed outside the fixed shell assembly;

a hook is provided inside the rotating sleeve; and an engagement platform cooperating with the hook is provided on the fixed shell assembly.

2. The rotation-adjustable lamp according to claim 1, wherein the main lamp body is provided with a hollowed-out portion, and one of the connecting portion and the control end passes through the hollowed-out portion and is connected to the other.

3. The rotation-adjustable lamp according to claim 2, wherein a position of the control end corresponds to a position of the hollowed-out portion.

4. The rotation-adjustable lamp according to claim 2, wherein the main lamp body comprises a driving assembly, and the driving assembly has the control end.

5. The rotation-adjustable lamp according to claim 4, wherein the driving assembly is provided within the fixed shell assembly, and the hollowed-out portion is provided on the fixed shell assembly.

6. The rotation-adjustable lamp according to claim 5, wherein the light-emitting assembly is provided on one side of the driving assembly away from the fixed shell assembly.

7. The rotation-adjustable lamp according to claim 5, wherein the fixed shell assembly comprises a lamp base component and a plastic shell component, the lamp base component is sheathed outside the plastic shell component, and the driving assembly is provided within the plastic shell component.

8. The rotation-adjustable lamp according to claim 7, wherein the hollowed-out portion comprises a first sub-hollowed portion provided on the lamp base component and a second sub-hollowed portion provided on the plastic shell component, and a position of the second sub-hollowed portion is aligned with a position of the first sub-hollowed portion.

9. The rotation-adjustable lamp according to claim 8, wherein the plastic shell component is provided with a snap fastener, and the snap fastener is clamped with an edge of the first sub-hollowed portion; or the lamp base component is provided with a snap fastener, and the snap fastener is clamped with an edge of the second sub-hollowed portion.

10. The rotation-adjustable lamp according to claim 5, wherein the driving assembly comprises a driver board and a dip switch;

the driver board is provided within the fixed shell assembly; and the control end is a toggle lever of the dip switch.

11. The rotation-adjustable lamp according to claim 10, wherein the dip switch is provided on one side of the driver board near a bottom of the fixed shell assembly.

12. The rotation-adjustable lamp according to claim 10, wherein a first mating portion is provided on the driver board; a second mating portion is correspondingly provided on an inner side of the fixed shell assembly; and the first mating portion is clamped with the second mating portion.

13. The rotation-adjustable lamp according to claim 10, wherein the connecting portion of the rotating sleeve comprises two oppositely provided limiting rods; and the control end is provided between two of the limiting rods.

14. The rotation-adjustable lamp according to claim 5, further comprising a bulb shell, wherein the bulb shell is sheathed on an outer side of the light-emitting assembly and is connected to the fixed shell assembly.

15. The rotation-adjustable lamp according to claim 1, wherein the connecting portion is detachably connected to the rotating sleeve.

16. The rotation-adjustable lamp according to claim 1, wherein an outer side of the rotating sleeve is provided with a protrusion.

17. The rotation-adjustable lamp according to claim 16, wherein a position of the protrusion corresponds to a position of the connecting portion.

18. The rotation-adjustable lamp according to claim 1, wherein the light-emitting assembly comprises a filament light source; and the filament light source is a same-level different-color-temperature filament, or at least two filaments of different color temperatures.

* * * * *